United States Patent [19]

MacGovern et al.

[11] 3,842,261

[45] Oct. 15, 1974

[54] OPTICAL ENCODER USING DIFFRACTION IMAGERY IN A REFLECTIVE MODE

[75] Inventors: Alan J. MacGovern, Acton; John A. O'Brien, Reading, both of Mass.

[73] Assignee: Itek Corporation, Lexington, Mass.

[22] Filed: Dec. 20, 1973

[21] Appl. No.: 426,874

[52] U.S. Cl. ........ 250/231 SE, 250/237 G, 356/169

[51] Int. Cl. ........ G01d 5/34

[58] Field of Search ...... 250/231 R, 231 SE, 237 R, 250/237 G; 324/175; 356/169, 170

[56] References Cited

UNITED STATES PATENTS

| | | | |
|---|---|---|---|
| 3,344,700 | 10/1967 | Brake | 356/169 |
| 3,630,622 | 12/1971 | Delang | 250/237 G |
| 3,770,970 | 11/1973 | Trump | 250/231 SE |
| 3,812,352 | 5/1974 | MacGovern | 250/237 G |

*Primary Examiner*—James W. Lawrence
*Assistant Examiner*—D. C. Nelms
*Attorney, Agent, or Firm*—Homer O. Blair; Robert L. Nathans; William C. Roch

[57] ABSTRACT

A reflective mode optical encoder wherein the elements of the encoder are optimally positioned according to diffraction theory. In the encoder a radiation source emits radiation having a mean wavelength $\lambda$ which passes through a transmissive code plate onto a reflective slit plate. The slit plate reflects the radiation back through the transmissive code plate onto a detector system. The code plate has on its surface periodic markings of alternating transmissive and opaque increments with the length of one transmissive increment — opaque increment cycle being designated $S_1$. The reflective slit plate has on its surface periodic markings of alternating reflective and non-reflective increments with the length of one reflective increment — non-reflective increment cycle being designated $S_2$. According to derived principles of diffraction theory, $S_2$ is chosen to be one-half $S_1$, and the gap (Z) between the plane of the periodic markings on the code plate and the plane of the periodic markings on the slit plate is selected to be $z = nS_1^2/2\lambda$ when $n$ equals a small integer.

6 Claims, 1 Drawing Figure

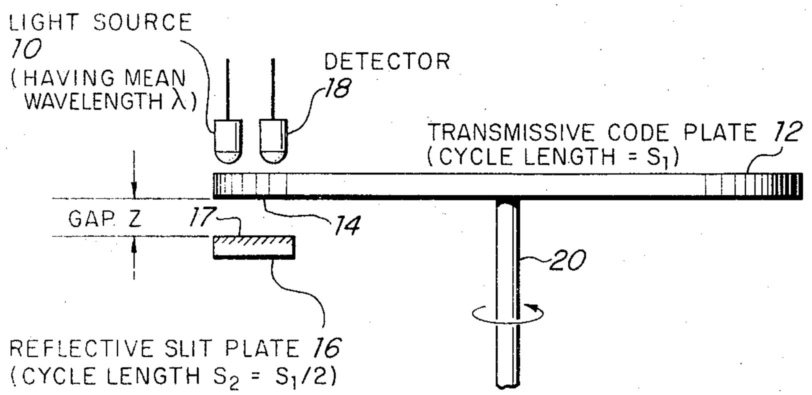
LIGHT SOURCE
10
(HAVING MEAN WAVELENGTH λ)
DETECTOR
18
TRANSMISSIVE CODE PLATE 12
(CYCLE LENGTH = S1)
GAP Z
17
14
20
REFLECTIVE SLIT PLATE 16
(CYCLE LENGTH S2 = S1/2)

OPTICAL ENCODER USING DIFFRACTION IMAGERY IN A REFLECTIVE MODE

BACKGROUND OF THE INVENTION

The present invention relates generally to an analog to digital reflective encoder for converting an analog, rotary or linear movement into a digital signal representative of that movement. More particularly, the present invention relates to a new and improved readout system for such a reflective encoder wherein all of the elements in the readout system are optimally positioned according to diffraction theory.

U.S. Patent application Ser. No. 284,382 for an Encoder Readout System, by Alan J. MacGovern, filed Aug. 28, 1972, explains the pinhole imaging theory which was traditionally utilized in the prior art to position elements of encoders. In that patent application, the state of the art of encoder readout systems was advanced to optimally design an encoder while taking into account diffraction effects of radiation in the encoder. The encoder illustrated in that patent application is a transmissive encoder wherein light passes from a radiation source through a transmissive code plate, then through a transmissive slit plate to a detector system. The present invention is a further advance in the state of the art wherein the principles of diffraction theory are applied to a reflective mode encoder, and optimal positions and parameters are determined for a reflective mode encoder.

SUMMARY OF THE INVENTION

In accordance with a preferred embodiment, diffraction theory is applied to a reflective mode encoder which measures the movement of a first radiation transmissive plate relative to a second reflective plate. The transmissive plate has periodic markings of alternating transmissive and opaque increments with the length of one transmissive increment — opaque increment cycle being $S_1$. The reflective plate has periodic markings of alternating reflective and non-reflective increments with the length of one reflective increment — non-reflective increment cycle being equal to one-half $S_1$ to satisfy diffraction theory. A radiation source produces radiation having a mean wavelength $\lambda$ and directs it through said first transmissive plate onto said second reflective plate where it is reflected and directed back through the first transmissive plate to a detector system which detects the modulation of radiation by said first and second plates. The first and second plates are optimally positioned within the encoder in accordance with diffraction theory and are spaced apart by a gap Z satisfying the following equation $Z = nS_1^2/2\lambda$ wherein $n$ equals an integer of one or greater.

The present invention results in an encoder having a gain of a factor of two in readout resolution over a transmissive encoder as described in U.S. patent application Ser. No. 284,382. This is because the reflective plate reimages by diffraction the periodic markings on the transmissive plate back onto itself but inverted about an axis perpendicular to the grating direction. The moire between the periodic markings on the transmissive plate and its own inverted image causes the radiation reaching the detector system to be modulated twice for each cycle change in position of the code plate grating. This results in an immediate gain by a factor of two in the resolution of the encoder, which means that such an encoder has a resolution twice that of a corresponding totally transmissive encoder.

Further, a reflective encoder built according to the teachings of this invention has the advantages of allowing large gaps and loose tolerances between the encoder code and slit plates while attaining significant modulation of the positional signal out of the encoder. The large encoder gap means that the encoder is more tolerant to dirt and dust in the encoder as the foreign particles are less likely to lodge between the code and slit plates and scratch the encoder tracks thereon. Also, the wide gap and loose tolerances simplify assembly, and result in a more reasonably priced encoder. Also, very significantly, an encoder built according to the teachings of this invention utilizes the effects of diffraction in the encoder to its advantage rather than having diffraction degrade the performance of the encoder.

BRIEF DESCRIPTION OF THE DRAWING

The FIGURE illustrates the relative positions of the components of a rotary, reflective encoder built according to the teachings of this invention.

DESCRIPTION OF A PREFERRED EMBODIMENT

For a more complete understanding of this invention, reference should be made to U.S. patent application Ser. No. 284,382 for an Encoder Readout System by Alan J. MacGovern, filed Aug. 28, 1972. That patent application gives an explanation of the prior art method of positioning encoder components according to pinhole imaging theory. The invention described therein represents a significant step forward in the art. The inventor applied the principles of diffraction theory to encoder design and derived certain basic equations which must be satisfied to optimally design an encoder in accordance with diffraction theory. The graphs in that patent application illustrate the dramatic improvement of performance of an encoder designed according to the teachings of that invention. Those graphs and the improvement of performance are equally applicable to the present invention, but will not be included in this patent application for the purpose of brevity.

Referring to the FIGURE, there is illustrated a light source 10 which emits radiation having a mean wavelength $\lambda$. This light source is preferably a light emitting diode, or alternatively may be an incandescent bulb. Radiation from the light source 10 passes through a transmissive code plate 12. As is well known in the encoder art, the code plate 12 has a code track 14 on its surface which has periodic markings of alternative transmissive and opaque increments, with the length of one transmissive increment — opaque increment cycle being designated $S_1$. The radiation is passed by the transmissive code plate 12 to a reflective slit plate 16. The slit plate 16 has a code track 17 on its surface which has periodic markings of alternating reflective and non-reflective increments, with the length of one reflective increment — non-reflective increment being designated $S_2$. According to the teachings of this invention, $S_2$ is selected to be $S_1/2$ for a reason to be explained later. Light reflected from the slit plate 16 passes back through the transmissive code plate 12 to a detector system 18 which produces an electrical signal indicative of rotational movement of the encoder shaft 20. The detector system 18 is illustrated as one detector, but in practice normally would be several detectors. The detector system 18 normally detects radiation passing through a plurality of transmissive increments in the code plate.

According to the teachings of U.S. patent application Ser. No. 284,382, the following two relationships must be simultaneously satisfied for a typical transmissive encoder: $Z_1 = nS_1S_2/\lambda$ and $Z_1 = [(S_1 - S_2)Z_2]/S_2$ where $n$ is an integer of one or greater, $\lambda$ is the mean wavelength of the light source, $S_1$ is the length of one transmissive increment — opaque increment cycle in the code plate, $S_2$ is the length of one transmissive increment — opaque increment cycle in the slit plate, $Z_1$ is the distance between the code plate periodic markings and slit plate periodic markings, and $Z_2$ is the distance between the detector system and the periodic markings on the slit plate.

The present invention resulted from the realization that the teachings of the above-mentioned patent application might be utilized in a reflective mode encoder. In a reflective mode encoder the slit plate, which is normally transmissive, reflects radiation. The radiation must pass back through the transmissive code plate to a detector system. In such a transmissive encoder, the code plate must also function as a bottom slit grating, known in the encoder art and illustrated in the above-mentioned patent application, which is positioned immediately before the detector system. In a reflective mode encoder $Z_1$ must be equal to $Z_2$. This results in the following equations: $Z_1 = nS_1S_2/\lambda$, $Z_1 = [(S_1 - S_2)Z_2]/S_2$ and $Z_1 = Z_2$. When these equations are combined and solved, the result is $S_2 = S_1/2$ and $Z_1 = Z_2 = ns_1^2/2\lambda$. When a reflective mode encoder is built with these two relationships, all of the advantages illustrated by the graphs in the aforementioned patent application accrue to the encoder, and one additional beneficial result is derived therefrom. The reflective grating 17 reimages by diffracting the code plate grating back onto itself but inverted about an axis perpendicular to the grating direction. The moire between the code plate track and its own inverted image causes the radiation reaching the detector system to be modulated twice for every cycle change in position of the code plate grating. This results in an immediate gain by a factor of two in the resolution of the encoder, which means that such an encoder has a resolution twice that of a corresponding totally transmissive encoder.

While several embodiments have been described, the teachings of this invention will suggest many other embodiments to those skilled in the art.

We claim:

1. In an encoder which measures the movement of a first radiation transmissive plate, having thereon periodic markings of alternating transmissive and opaque increments relative to a second reflective plate, having thereon periodic markings of alternating reflective and non-reflective increments, the improvement comprising the encoder and a readout system in the encoder being optimally designed while taking into account diffraction effects of radiation in the encoder and comprising:

a. a first transmissive plate having thereon periodic markings of alternating transmissive and opaque increments, with the length of one transmissive increment — opaque increment cycle being $S_1$;

b. a second reflective plate side having thereon periodic markings of alternating reflective and non-reflective increments, with the length of one reflective increment — non-reflective increment cycle being equal to one-half $S_1$ to satisfy diffraction theory;

c. a radiation source for producing radiation having a mean wavelength $\lambda$ and for directing the radiation through said first transmissive plate onto said second reflective plate where it is reflected and directed back through said first transmissive plate, with relative movement between said first plate and second plates causing modulation of the radiation;

d. a detector means for detecting the modulation of radiation by said first transmissive and said second reflective plates; and e. means for optimally positioning said first and second plates in accordance with diffraction theory and including means for positioning said first plate relative to said second plate with a gap (Z) between them substantially satisfying the following equation, $Z = nS_1^2/2\lambda$ wherein $S_1$ and $\lambda$ have already been defined and $n$ equals an integer of 1 or greater.

2. An encoder as set forth in claim 1 wherein $n$ equals 1.

3. An encoder as set forth in claim 1 wherein $n$ equals 2.

4. An encoder as set forth in claim 1 wherein the encoder is a linear encoder.

5. An encoder as set forth in claim 1 wherein the encoder is a rotary encoder.

6. An encoder as set forth in claim 1 wherein said transmissive plate is mounted for movement within the encoder, and said reflective plate is mounted in a stationary position in said encoder.

* * * * *